(12) United States Patent
Vora et al.

(10) Patent No.: US 11,948,220 B2
(45) Date of Patent: *Apr. 2, 2024

(54) SYSTEMS AND METHODS FOR DYNAMICALLY SELECTING TRANSPORTATION OPTIONS BASED ON TRANSPORTATION NETWORK CONDITIONS

(71) Applicant: Lyft, Inc., San Francisco, CA (US)

(72) Inventors: Abhinav Amrut Vora, San Francisco, CA (US); Hao Yu Liu, Union City, CA (US); Benjamin Han, San Francisco, CA (US); Julia Yu, San Francisco, CA (US); Le Guan, San Francisco, CA (US); Xiaoyuan Xu, San Mateo, CA (US); Mayank Gulati, San Francisco, CA (US); Charles Parker Spielman, San Francisco, CA (US); Chirag Chhagan Chheda, San Francisco, CA (US); David Chouinard, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,994

(22) Filed: Dec. 21, 2021

(65) Prior Publication Data
US 2022/0164914 A1    May 26, 2022

Related U.S. Application Data

(63) Continuation of application No. 16/207,004, filed on Nov. 30, 2018, now Pat. No. 11,238,555.

(51) Int. Cl.
*G06Q 10/06*    (2023.01)
*G06Q 10/0631*    (2023.01)
*G06Q 50/30*    (2012.01)

(52) U.S. Cl.
CPC ..... *G06Q 50/30* (2013.01); *G06Q 10/063114* (2013.01); *G06Q 10/06315* (2013.01)

(58) Field of Classification Search
None
See application file for complete search history.

(56) References Cited

U.S. PATENT DOCUMENTS

| | | | | |
|---|---|---|---|---|
| 9,769,616 | B1 * | 9/2017 | Pao | H04W 4/023 |
| 2010/0280752 | A1 * | 11/2010 | Huang | G06Q 40/00 |
| | | | | 701/517 |

(Continued)

OTHER PUBLICATIONS

Uber (Uber Pool vs Express Pool: What's the difference?, pp. 1-13, Published on wayback machine Jun. 11, 2018—https://web.archive.org/web/20180611032135/https://www.ridesharingdriver.com/whats-uberpool-shared-ride-cheaper-than-other-uber-services/).*

*Primary Examiner* — Matthew D Henry
(74) *Attorney, Agent, or Firm* — Greenberg Traurig, LLP

(57) ABSTRACT

The disclosed computer-implemented method may include dynamically selecting transportation options to present to a transportation requestor device based on current transportation network conditions and transportation requestor device history. In some embodiments, transportation network may have many different ways of arranging a transportation requestor's trip, such as private rides, shared rides, immediate rides, and delayed rides. In some examples, the requestor's choice of transportation option may have an impact on the transportation network. In anticipation of or in response to a transportation request, the method may determine which transportation options will better benefit the transportation network and determine which transportation options to display to the requestor and/or the prominence with which the transportation products are displayed. Various other methods, systems, and computer-readable media are also disclosed.

20 Claims, 13 Drawing Sheets

(56) References Cited

U.S. PATENT DOCUMENTS

| | | | |
|---|---|---|---|
| 2013/0268406 A1* | 10/2013 | Radhakrishnan | G06Q 30/0284 705/26.61 |
| 2014/0129951 A1* | 5/2014 | Amin | G06Q 30/0635 715/738 |
| 2014/0365250 A1* | 12/2014 | Ikeda | G06Q 10/02 705/5 |
| 2015/0161564 A1* | 6/2015 | Sweeney | G06Q 10/063114 705/338 |
| 2019/0244318 A1* | 8/2019 | Rajcok | H04W 4/029 |
| 2020/0081933 A1* | 3/2020 | Jiang | H04L 67/60 |

* cited by examiner

SYSTEMS AND METHODS FOR DYNAMICALLY SELECTING TRANSPORTATION OPTIONS BASED ON TRANSPORTATION NETWORK CONDITIONS

CROSS REFERENCE TO RELATED APPLICATION

This application is a continuation of U.S. application Ser. No. 16/207,004, filed 30 Nov. 2018, the disclosure of which is incorporated in its entirety by this reference.

BACKGROUND

A dynamic transportation network that provides on-demand transportation to transportation requestors may have many different ways of arranging a transportation requestor's trip. For example, a transportation network may offer, private rides, shared rides, pickups at the requestor's location, immediate rides, delayed rides, and so forth. In some cases, a requestor may be overwhelmed if presented with all possible transportation options and may be inclined to select the default or most prominently displayed transportation option rather than making a more considered selection. Additionally, different transportation options may have different impacts on the conditions of the transportation network. Accordingly, the instant disclosure identifies and addresses a need for additional and improved systems and methods for dynamically selecting transportation options.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
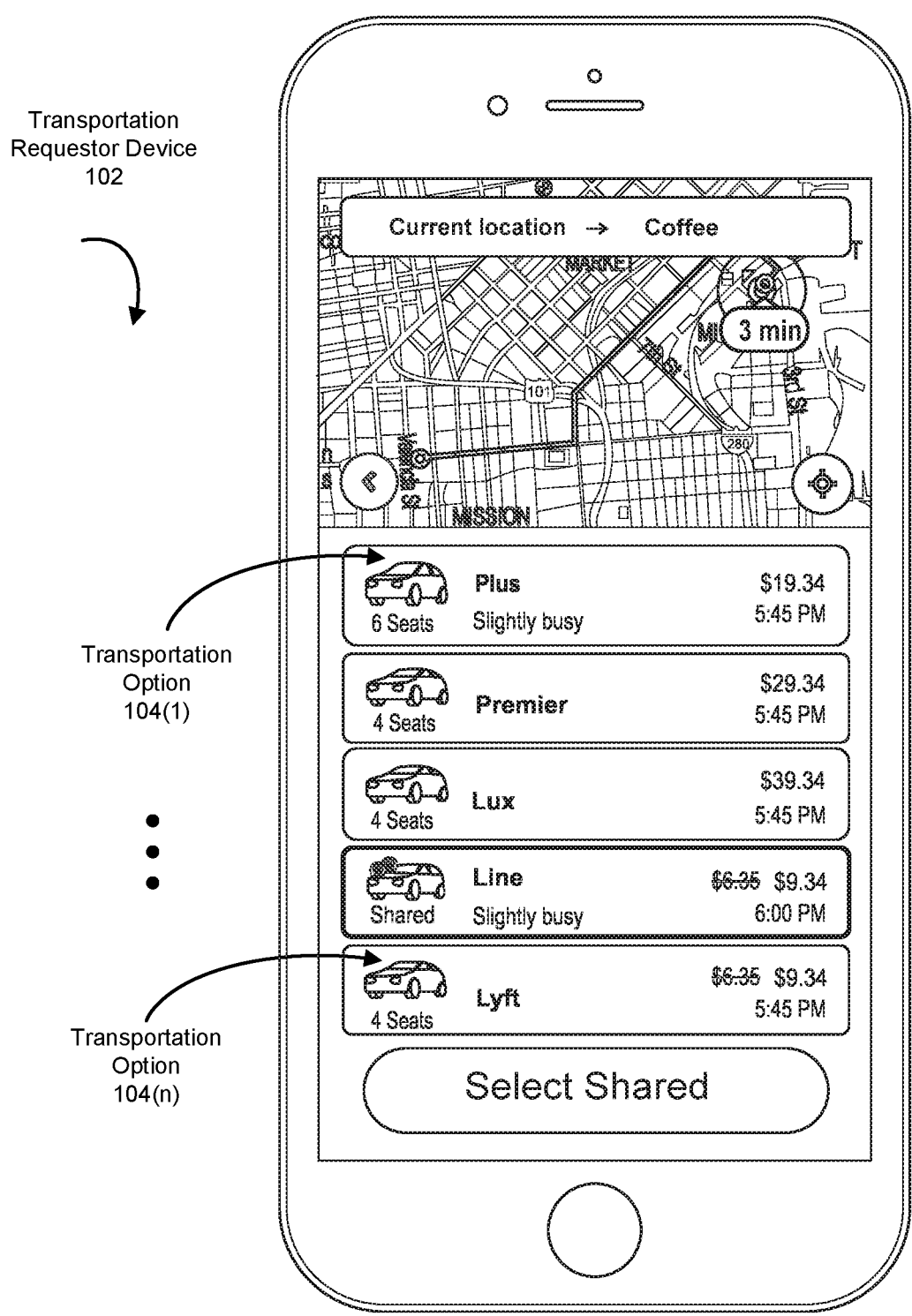
FIG. 1 is an illustration of an example transportation requestor device displaying multiple transportation options.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to dynamically selecting transportation options to present to a transportation requestor device based on current transportation network conditions and transportation requestor device history. In some examples, a transportation network may have many different ways of arranging a transportation requestor's trip (e.g., private rides vs. shared rides, pickups at the requestor's location vs. pickups at a meeting place, immediate matching to a ride vs. delaying to find better matches, etc.). In some cases, the requestor's choice of transportation option may have an impact on the transportation network. For example, when supply within the transportation network is low, a private ride instead of a shared ride may exacerbate the problem. In addition, a requestor may be overwhelmed if presented with all possible options and/or may be inclined to select the default or most prominently displayed option rather than making a more considered selection. Accordingly, in anticipation of or in response to a transportation request, the method may determine which transportation options will better benefit the transportation network and determine which transportation options to display to the requestor and/or the prominence with which the transportation options are displayed. In addition, the method may account for the requestor's preferences (e.g., based on historical data) to determine which options the requestor is likely to select, thereby improving user experience while also improving the odds that the requestor will select an option that benefits the transportation network. In some examples, the method may use real-time conditions of the transportation network to prioritize transportation options offered to requestors.

Accordingly, as may be appreciated, the systems and methods described herein may improve the functioning of a computer that facilitates transportation via a dynamic transportation network. Furthermore, for the reasons mentioned above and to be discussed in greater detail below, the systems and methods described herein may provide advantages to dynamic transportation management and/or the field of transportation by improving the efficiency of dynamic transportation networks and/or improving user experience.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, the dynamic transportation network may include personal mobility vehicles. In some embodiments, a dynamic transportation network may include autonomous vehicles (e.g., self-driving cars) that may be capable of operating with little or no input from a human operator.

FIG. 1 illustrates an example transportation requestor device displaying multiple transportation options. As illustrated in FIG. 1, a transportation requestor device 102 may display transportation option 104(1) through transportation option 104(n). In some examples, transportation options 104(1)-(n) may be generated by a naïve selection algorithm, such as by selecting whichever transportation options are physically closest to the pickup location specified by the transportation requestor device. In some examples, some of transportation options 104(1)-(n) may have unfavorable impacts on the dynamic transportation network if selected. For example, if the network is experiencing high utilization, an individual transportation requestor selecting an extralarge (XL) vehicle may exacerbate the situation by preventing the XL vehicle from being available for larger parties of transportation and/or requestors that are willing to share rides, thus more efficiently using the available provider associated with the XL vehicle. In another example, if the dynamic transportation network is expecting high estimated times to arrival (ETAS) for incoming requests, the systems described herein may benefit from emphasizing delayed matching options that enable the dynamic matching system to match requestors more efficiently. Furthermore, transportation options 104(1)-(n) may not reflect the preferences of the transportation requestor associated with transportation requestor device 102. For example, if the transportation requestor exclusively requests luxury transportation options, displaying non-luxury options to the transportation requestor may be unnecessary and lead to a poor user experience. Additionally, displaying all available transportation options may overwhelm the transportation requestor, leading the transportation requestor to make a less optimal selection than if low-probability or otherwise unfavorable options were not displayed.

Figure 2:
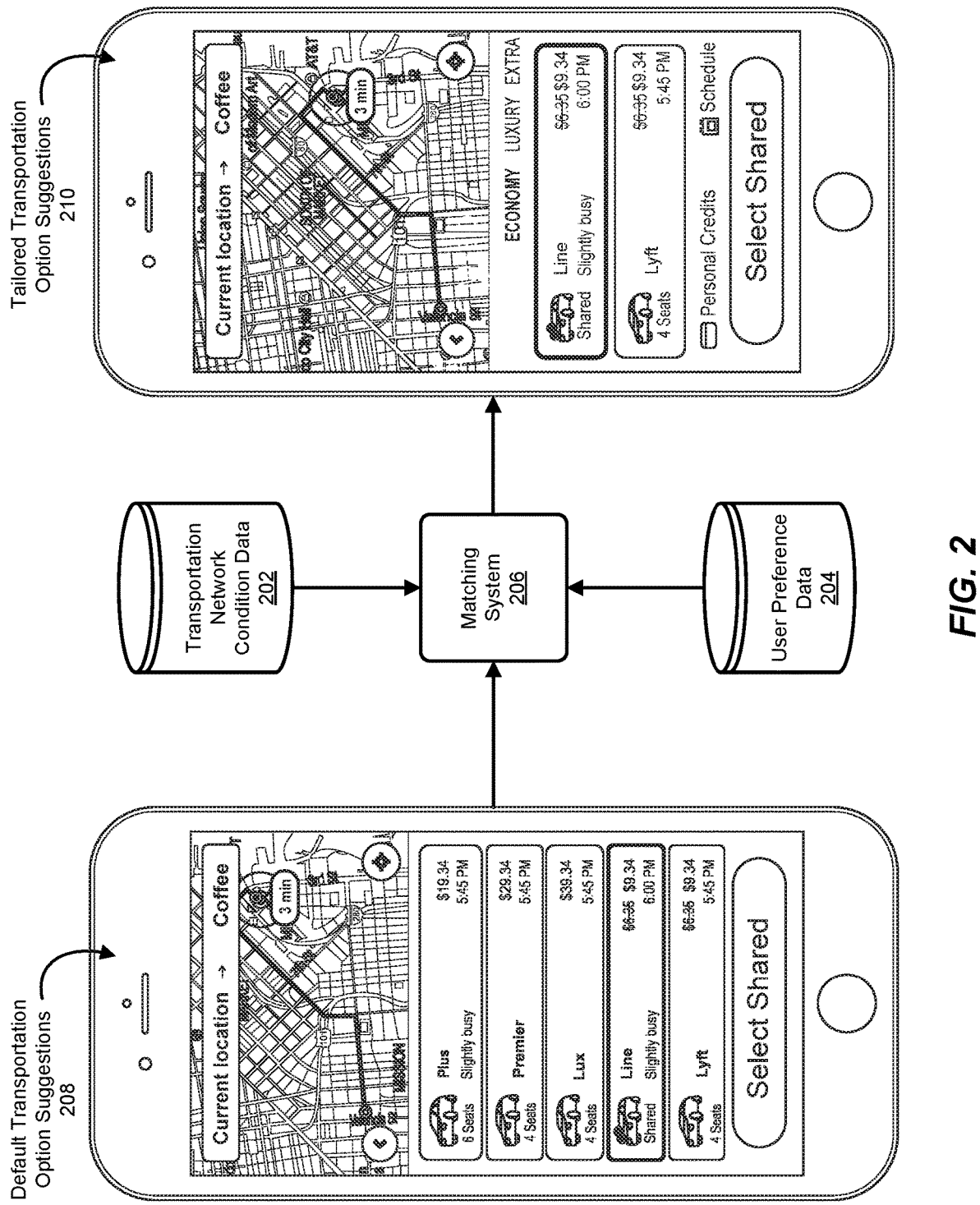
FIG. 2 is an illustration of an example architecture for selecting transportation options to display on a transportation requestor device.

FIG. 2 illustrates an example architecture for selecting transportation options to display on a transportation requestor device. As illustrated in FIG. 2, default transportation option suggestions 208 may include a naïvely generated list of options that do not take into account requestor preference and/or network impact. In some examples, a naïvely generated list may be in alphabetical order by option name, ordered by overall popularity of each option, and/or ordered by frequency of past selection of each option by the transportation requestor. In some examples, a naïvely generated list may not display the most appropriate options for the current situation (e.g., may not display the options which are most beneficial to the network and/or which the transportation requestor prefers), may display options in an order that is unintuitive to the transportation requestor, and/or may display a confusingly high number of options. In some embodiments, a matching system 206 (i.e., a dynamic transportation matching system) may receive the transportation request from the requestor device and may then retrieve information from transportation network condition data 202 and/or user preferences data 204. In some examples, transportation network condition data 202 may include information such as available transportation provider resources, expected transportation request volume, current transportation requests associated with a particular road segment, region, area, street, and/or neighborhood, current traffic conditions, and/or any other suitable transportation network condition information. In some examples, user preferences data 204 may include information about preferences manually selected by the transportation requestor and/or information inferred from previous transportation option selections by the transportation requestor and/or similar transportation requestors (e.g., that share demographic characteristics with the transportation requestor). Based at least in part on transportation network condition data 202 and/or user preferences data 204, matching system 206 may generate tailored transportation option suggestions 210. In some examples, tailored transportation option suggestions 210 may include fewer options than default transportation option suggestions 208, may show options ordered differently than default transportation option suggestions 208, and/or may include different options than default transportation option suggestions 208. In some embodiments, tailored transportation option suggestions 210 may be tailored at least in part based on improving system metrics for the transportation network. For example, tailored transportation option suggestions 210 may include and/or highlight options that, if selected, improve overall estimated arrival time across the network, improve network utilization rates, reduce total distance traveled by transportation providers and/or requestors, reduce travel time for transportation providers and/or requestors, reduce fees paid (e.g., bridge tolls and/or express lane fees) by transportation providers, and/or improve any other relevant system metric.

Figure 3:
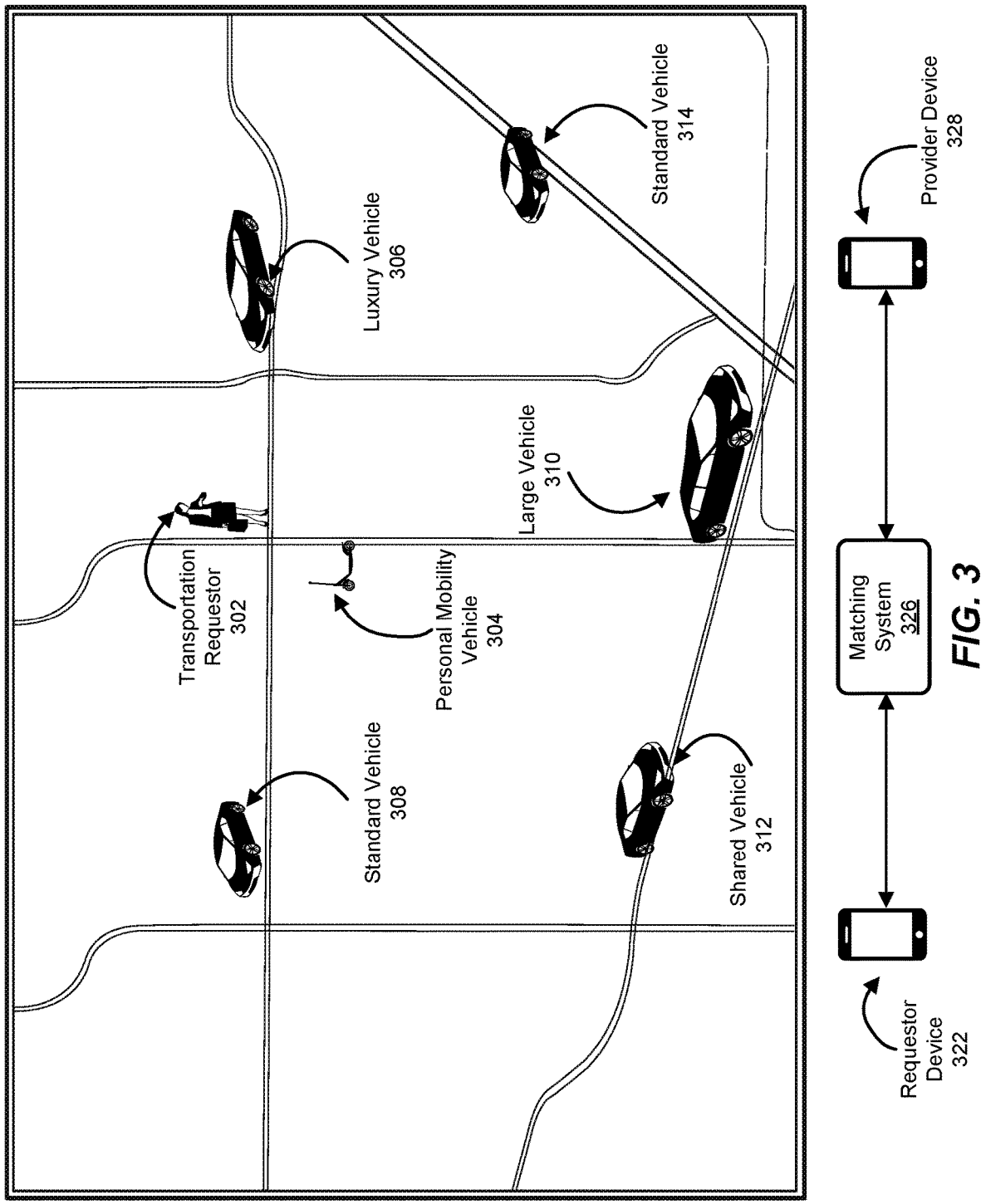
FIG. 3 is an illustration of an example dynamic transportation network managed by a dynamic transportation matching system.

FIG. 3 illustrates an example dynamic transportation network managed by a dynamic transportation matching system. In one example, a matching system 326 may receive a transportation request from a requestor device 322 operated by a transportation requestor 302. In some examples, a variety of transportation providers offering various transportation options may be in the nearby area, such as personal mobility vehicle 304, luxury vehicle 306, standard vehicle 308, large vehicle 310, shared vehicle 312, and/or standard vehicle 314. In some examples, matching system 326 may take into account the current location and/or destination of transportation requestor 302 into account when selecting transportation options. In one embodiment, matching system 326 may take into account the states of the various provider vehicles when determining what transportation options to display on a requestor device 322. For example, if a higher percentage of nearby provider devices are currently matched with requestor devices, the systems described herein may increase the prominence of delayed matching options to improve the likelihood of matching requestor device 322 with a nearby transportation provider device (e.g., if a transportation provider becomes available due to a currently matched requestor device cancelling the match or switching from a private to a shared ride). In another example, if many standard providers are occupied but few luxury providers are, matching system 326 may increase the prominence of luxury vehicle 306 in the display on requestor device 322. In some embodiments, matching system 326 may offer incentives for transportation requestor 302 to select a transportation option that is beneficial to the dynamic transportation network. For example, matching system 326 may offer a ride in luxury vehicle 306 at a reduced rate. In another example, in order to keep standard vehicle 308 available for other requests, matching system 326 may offer a credit towards a future ride if transportation requestor 302 chooses to match with standard vehicle 314 rather than standard vehicle 308 despite the additional wait time. In one example, if traffic congestion is very high near transportation requestor 302, matching system 326 may only display transportation options that involve walking and/or taking personal mobility vehicle 304 to meet a transportation provider in order to prevent transportation providers from expending time waiting in traffic to meet transportation requestor 302.

Additionally or alternatively, matching system 326 may take the previous behavior of transportation requestor 302 and/or transportation requestors with similar characteristics (e.g. region, demographics, etc.) into account when selecting transportation options. For example, if transportation requestor 302 has a history of ignoring transportation options that involve using a personal mobility vehicle to reach a meeting point, matching system 326 may not display transportation options that involve personal mobility vehicle 304. In another example, if transportation requestor 302 has no request history but similar transportation requestors typically prefer standard rides with no delays, matching system 326 may display the option to match with standard vehicle 308 in a visually prominent position to improve the user experience for transportation requestor 302. In some embodiments, the systems described herein may use information received from external applications. For example, if a calendar application shows that transportation requestor 302 has a meeting in twenty minutes, matching system 326 may not display matching options that involve delayed matching and/or may not display shared ride options that involve detours to pick up additional requestors. In one example, if transportation requestor 302 has a history of choosing the least expensive transportation options, matching system 326 may select transportation options that involve delayed matching (e.g., waiting several minutes before being matched with a transportation provider in order to improve efficiency in the transportation network) at less cost than immediate matching. In some embodiments, matching system 326 may take location, time of day, time of week, weather, and/or other factors into account when determining what option transportation requestor 302 is most likely to select. For example, transportation requestor 302 may have a history of selecting shared rides during rush hour but private rides at all other times. In other examples, transportation requestor 302 may have a history of selecting the option with the soonest pick-up time during inclement weather. Once transportation requestor 302 has selected a transportation option, matching system 326 may match requestor device 322 with a provider device 328.

Figure 4:
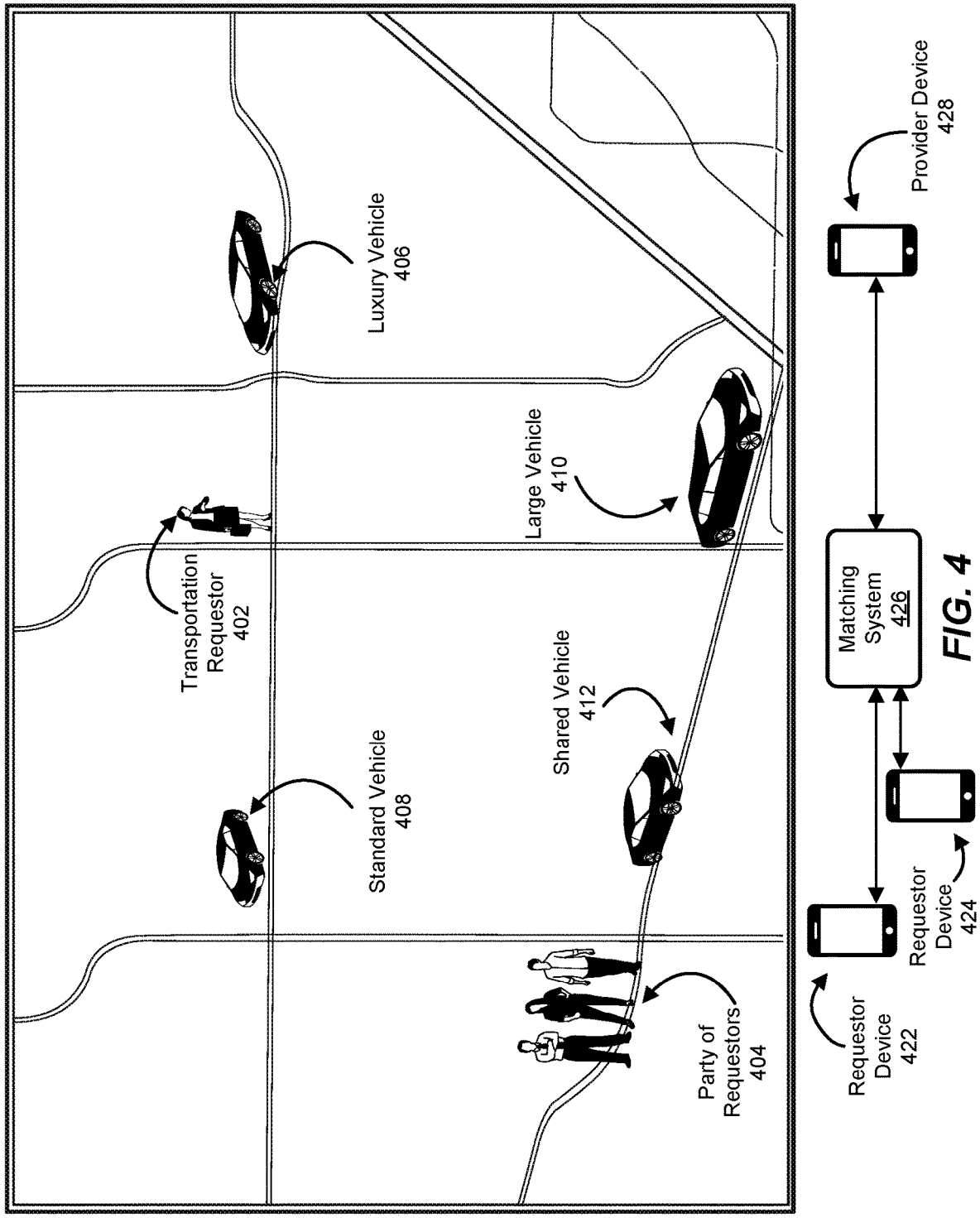
FIG. 4 is an illustration of an example dynamic transportation network managed by a dynamic transportation matching system.

FIG. 4 illustrates an example dynamic transportation network managed by a dynamic transportation matching system. In some examples, a matching system 426 may receive transportation requests from multiple transportation requestors and/or groups of requestors, such as a transportation requestor 402 associated with a requestor device 422 and/or a party of requestors 404 associated with a requestor device 424. In one example, matching system 426 may display different transportation options on requestor device 422 due to having received a transportation request from requestor device 424. For example, matching system 426 may not display the option to match with a large vehicle 410 on requestor device 422 in order to reserve large vehicle 410 for matching with requestor device 424 to accommodate party of requestors 404. In some examples, large vehicle 410 may be the only large vehicle in the area and matching system 426 may not display the option to match with large vehicle 410 on requestor device 422 in order to preserve the availability of large vehicle 410 for potential parties of transportation requestors and/or shared rides, even in the absence of a specific request by a party of requestors. Instead, matching system 426 may select options to match with a luxury vehicle 406, a shared vehicle 412, and/or a standard vehicle 408. In some examples, matching system 426 may match requestor device 424 with a provider device 428 associated with large vehicle 410.

Figure 5:
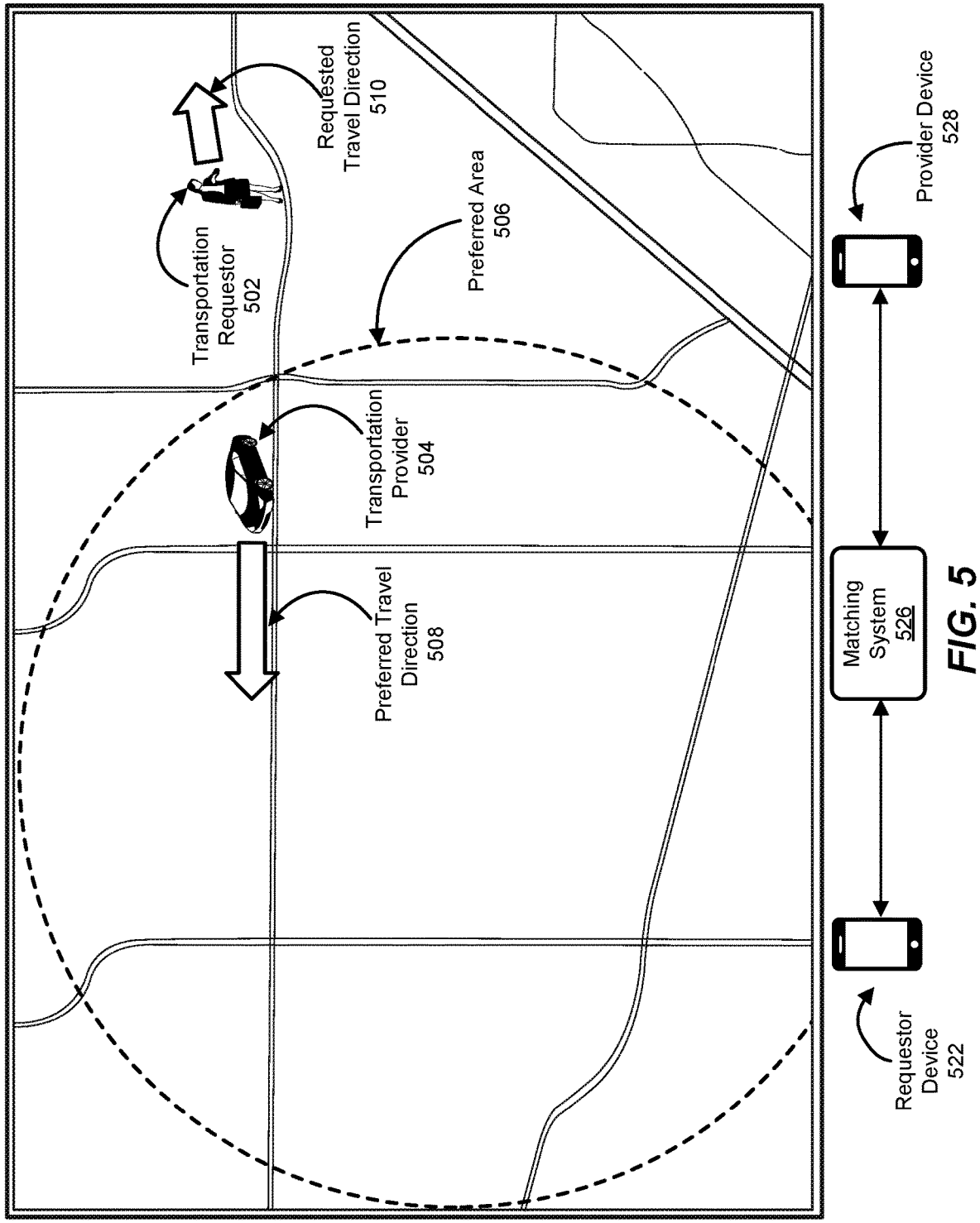
FIG. 5 is an illustration of an example scenario involving a transportation provider.

FIG. 5 illustrates an example scenario involving a transportation provider. In some examples, a dynamic transportation matching system may select transportation options for a transportation provider to fulfill transportation requests. In one example, a transportation provider 504 associated with a transportation provider device 528 may have a preferred travel direction 508. For example, transportation provider 504 may want to travel towards home and/or towards an area with a greater density of transportation requestors. In one example, transportation provider 504 may have a preferred area 506 outside of which transportation provider 504 may prefer not to travel. In some examples, a matching system 526 may receive a request from a requestor device 522 associated with a transportation requestor 502 who is located outside of preferred area 506 and/or has a requested travel direction 510 that significantly differs from preferred travel direction 508. In one example, in order to fulfill the transportation request from requestor device 522 in a way that benefits the transportation network, matching system 526 may offer provider device 528 the option to match with a request from requestor device 522 despite the fact that fulfilling the transportation request would contravene the preferences of transportation provider 504. In some examples, matching system 526 may offer incentives for selecting the option to match with requestor device 522 to fulfill the transportation request, such as increasing a payment to transportation provider 504, providing transportation provider 504 with a better multiplier for payment bonuses, and/or offering transportation provider 504 preferential treatment when distributing future transportation requests among transportation providers. In some examples, matching system 526 may present transportation provider 504 with the option to provide a different type of transportation than normal. For example, if transportation provider 504 typically provides luxury transportation but there is high demand for standard transportation and low demand for luxury transportation, matching system 526 may present transportation provider 504 with the option to provide standard transportation.

Figure 6:
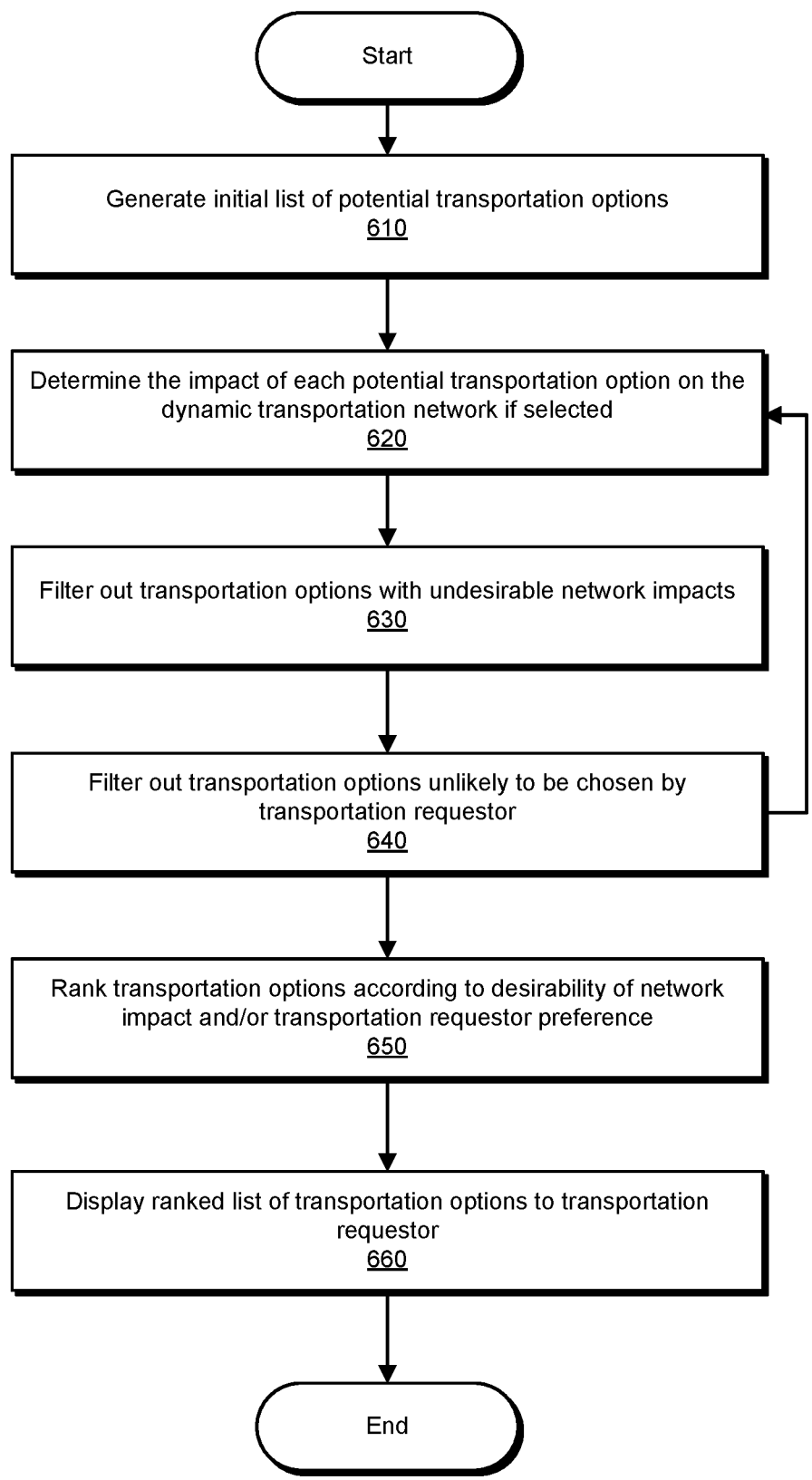
FIG. 6 is a flow diagram of an example method for dynamically selecting transportation options.

FIG. 6 is a flow diagram of an example method for dynamically selecting transportation options. In some embodiments, at step 610, a dynamic transportation matching system may generate an initial list of potential transportation options. The dynamic transportation matching system may generate this initial list in a variety of ways. For example, the dynamic transportation matching system may examine the status of all nearby provider vehicles and/or may include all options for matching with a particular provider such as delayed matching, shared rides, and/or other options.

At step 620, the dynamic transportation matching system may determine the impact of each potential transportation option on the dynamic transportation network if selected. For example, the dynamic transportation matching system may use an objective function, neural network, machine learning model, and/or any suitable type of algorithm and/or module to estimate the impact on the transportation network. At step 630, the dynamic transportation matching system may filter out options with undesirable network impacts. For example, the dynamic transportation matching system may filter out options that would add delay for other transportation requestors, increase provider utilization above a predetermined threshold, decrease provider utilization below a predetermined threshold, cause providers and/or capacity to be geographically distributed in a sub-optimal way (e.g. by moving a high-capacity provider from an area of high demand to an area of low demand), and/or any other undesirable impact. In some examples, filtering may involve hiding a transportation option and/or de-emphasizing and/or lowering the score (i.e., the position in the displayed list) of a transportation option. In some examples, at step 640, the dynamic transportation network may filter out options unlikely to be chosen by the transportation requestor. For example, if the transportation requestor has never previously chosen delayed matching, the dynamic transportation matching system may filter out transportation options that involve delayed matching. In stop embodiments, the dynamic transportation matching system may repeat steps 620, 630, and/or 640, repeatedly narrowing down the available options based on network impact and/or requestor preference until a predetermined number of options remain and/or a predetermined number of cycles of consideration have executed.

At step 650, the dynamic transportation matching system may rank transportation options according to desirability of network impact and/or transportation requestor preference. For example, the dynamic transportation matching system may list transportation options with the options most desirable for the transportation network at the top. In some embodiments, the dynamic transportation matching system may highlight or otherwise increase the prominence of one or more especially desirable and/or likely-to-be-selected options. In some examples, the dynamic transportation matching system may select and/or highlight an option based on determining that the probability that the requestor will choose the option is moderate and/or unclear. In some examples, the dynamic transportation matching system may also determine incentives to attach to one or more options. For example, if choosing delayed matching would be very beneficial for the network, the dynamic transportation matching system may offer the requestor a discount and/or credit for choosing delayed matching. This one example, the discount and/or credit may be calculated based on the expected network impact of choosing delayed over immediate matching.

At step 660, the dynamic transportation matching system may display the ranked list of transportation options to the transportation requestor, for example by sending the list to an application that displays the ranked list in a graphical user interface on the transportation requestor device. In some embodiments, rather than a server performing the filtering and/or sorting, the application on the transportation requestor device may perform the filtering and/or sorting by receiving relevant data from the server. In some examples, based on the option selected by the requestor, the matching system may display additional options. For example, the matching system may initially present the requestor with the choice of standard, luxury, or shared transportation and, after receiving a selection, may then present the requestor with the choice of immediate or delayed matching. In another example, a requestor may reject all of the initially displayed options and/or may request to see more options, and the systems described herein may generate a new list of options for the transportation requestor. In some examples, after a requestor has selected an option, the dynamic transportation matching system may offer the transportation requestor a future transportation option based on the context of the selected option. For example, if the requestor selected a standard ride from their home to their work, the matching system may offer the requestor a standard ride nine from their work to their home at a time nine hours in the future. In one example, the matching system may offer the transportation requestor a discount for accepting the future ride in advance, enabling the matching system to plan more efficiently.

In some embodiments, the dynamic transportation matching system may present one or more transportation options to a requestor who is currently being transported via the dynamic transportation network. For example, the dynamic transportation matching system may present a requestor being transported via a private ride option with the opportunity to switch to a shared ride option by picking up an additional transportation requestor who is along the planned route of the original requestor. In some examples, the matching system may provide the requestor with an incentive to change transportation option, such as a discount or credit, that is calculated based on the impact of the change in transportation option on the transportation network. In some embodiments, the dynamic transportation matching system may only present a requestor with an option to change transportation option if the probability of the requestor changing is above a certain threshold. For example, a requestor is much less likely to agree to share a ride with an additional requestor if the additional requestor is far off the planned route and would significantly delay the trip than if the additional requestor is on or near the planned route. In another example, if a requestor always declines the option to share with an additional requestor mid-ride, the matching system may cease presenting the requestor with this type of option. In some embodiments, mid-ride opportunities to switch transportation option may be presented for a limited time (e.g., twenty seconds) before being withdrawn. In some examples, switching transportation options may involve transferring vehicles. For example, if a requestor is being transported by a high-capacity vehicle (e.g., a vehicle with several seats that are potentially available to transportation requestors) and network utilization is high, the dynamic transportation matching system may present the requestor with the opportunity to switch to a transportation option in a lower-capacity vehicle by transferring to a smaller vehicle.

Figure 7:
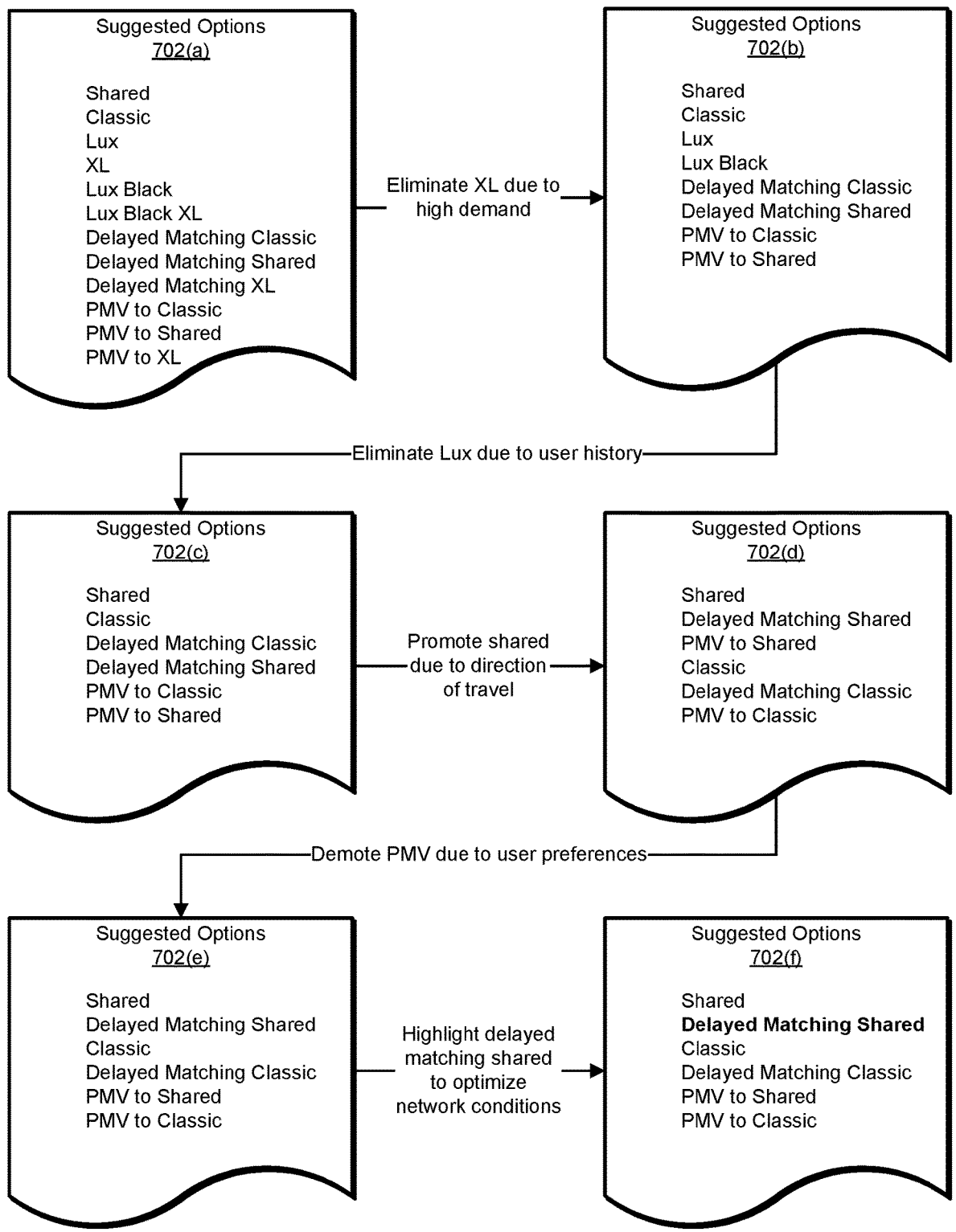
FIG. 7 is a diagram of an example ranking of transportation options.

FIG. 7 is a diagram of an example ranking of transportation options. While illustrated as separate steps in FIG. 7, in some embodiments, the systems described herein may perform all steps simultaneously through a single scoring algorithm and/or machine learning model. In some embodiments, a dynamic transportation matching system may start by generating a list of numerous available transportation options. For example, suggested options 702(*a*) may include various combinations of available transportation providers and available options for matching with those providers. In one example, the dynamic transportation matching system may immediately eliminate XL options from the list due to high demand, keeping multiple-seat vehicles free for larger parties and/or shared rides. After examining suggested options 702(*b*), the dynamic transportation matching system may eliminate luxury options due to the transportation requestor's history of never selecting luxury options, producing suggested options 702(*c*). Next, the dynamic transportation matching system may sort the list, promoting shared ride options because the transportation requestor is traveling from a high-demand area to a low-demand area and it is more beneficial for the network if fewer vehicles leave the high-demand area. In some examples, suggested options 702(*d*) may be further sorted based on stored requestor preferences. For example, the requestor may have toggled a preference indicating that the requestor prefers not to use personal mobility vehicle. This sorting may produce suggested options 702(*e*), the final ranked list of options that will be shown to the requestor. The dynamic transportation matching system may then determine that delayed matching will be favorable for the network and may highlight a transportation option that includes delayed matching, producing suggested options 702(*f*). In some embodiments, the systems described herein may continuously regenerate lists of potential transportation options and re-rank the lists in real time (e.g., every five seconds). In some examples, the systems described herein may generate and/or rank a new list of transportation options in response to a transportation requestor selecting or rejecting an option or category of options. For example, if a requestor selects a shared transportation option, the systems described herein may present the user with additional types of shared transportation options (e.g., standard, luxury, immediate matching, and/or delayed matching). In another example, transportation options may be categorized and different transportation options may be presented based on a category selected by a requestor. For example, a transportation requestor may select the luxury category and in response the systems described herein may present the requestor with several luxury options (e.g., standard, large, etc.). In one example, a requestor may reject an option for delayed matching, and the systems described herein may remove all options involving delayed matching (e.g., private delayed, shared delayed, and/or luxury delayed) from the list of options presented to the requestor.

Figure 8:
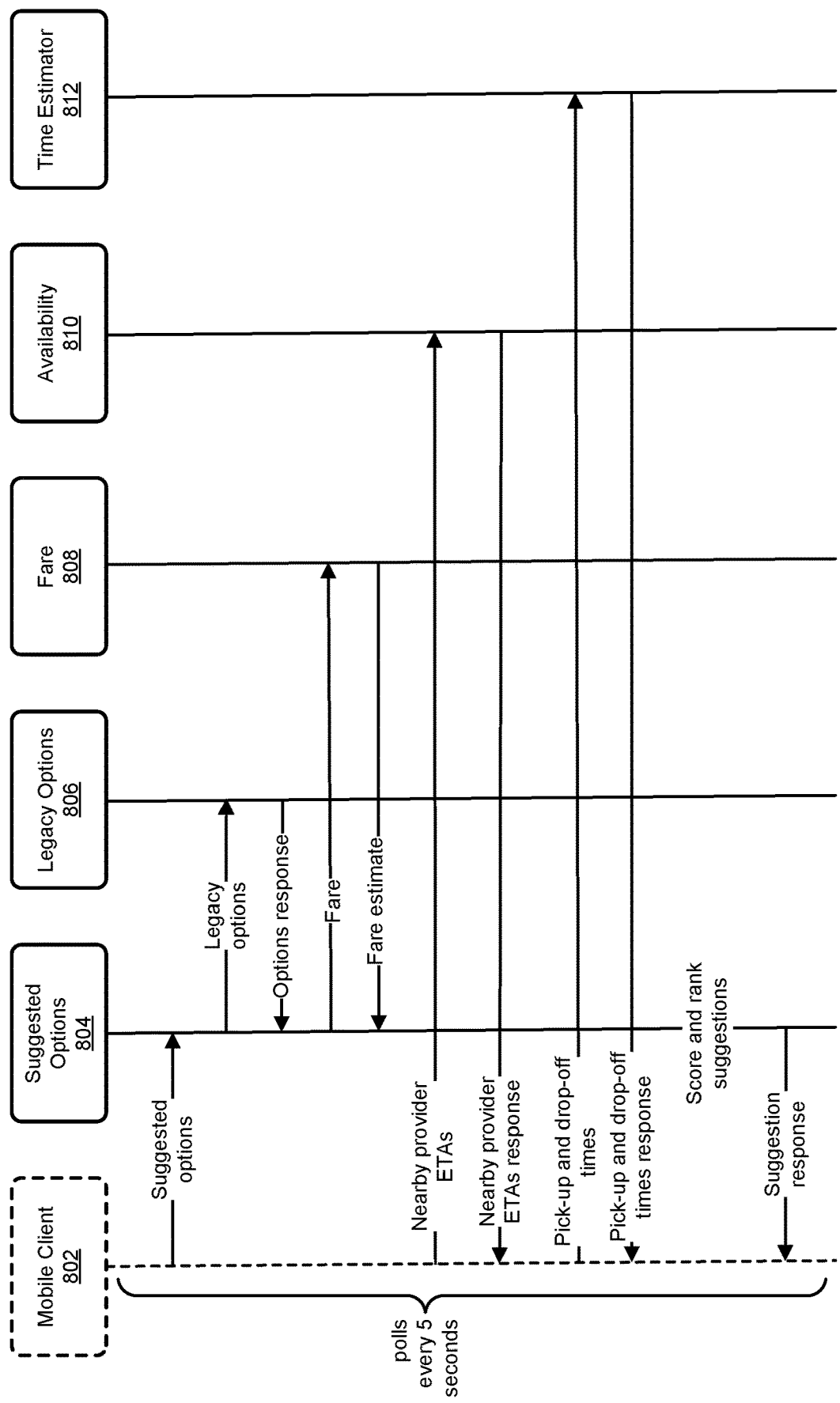
FIG. 8 is a flow diagram of an example method for dynamically selecting transportation options.

FIG. 8 is a flow diagram of an example method for dynamically selecting transportation options via messages to an interface and/or series of modules, such as an application programming interface (API). In one embodiment, a mobile client 802, such as an application on a transportation requestor device, may make a call to suggested options 804 to determine a list of suggested transportation options. Suggested options 804 may make a call to legacy options 806 and/or fare 808 to determine data about previous history for the transportation requestor and/or available fares. Additionally, mobile client 802 may make calls to availability 810 and/or time estimator 812 to determine nearby transportation providers and/or estimated pick-up and/or drop-off times. In some embodiments, some portion of the interface and/or some module, such as suggested options 804, may score and rank available options based at least in part on information received from other interfaces and/or modules and may return a sorted list of suggested options to mobile client 802. In some embodiments, mobile client 802 may poll the interface and/or modules at regular intervals, such as every five seconds, in order to constantly have up-to-date options based on the current transportation network state.

Figure 9:
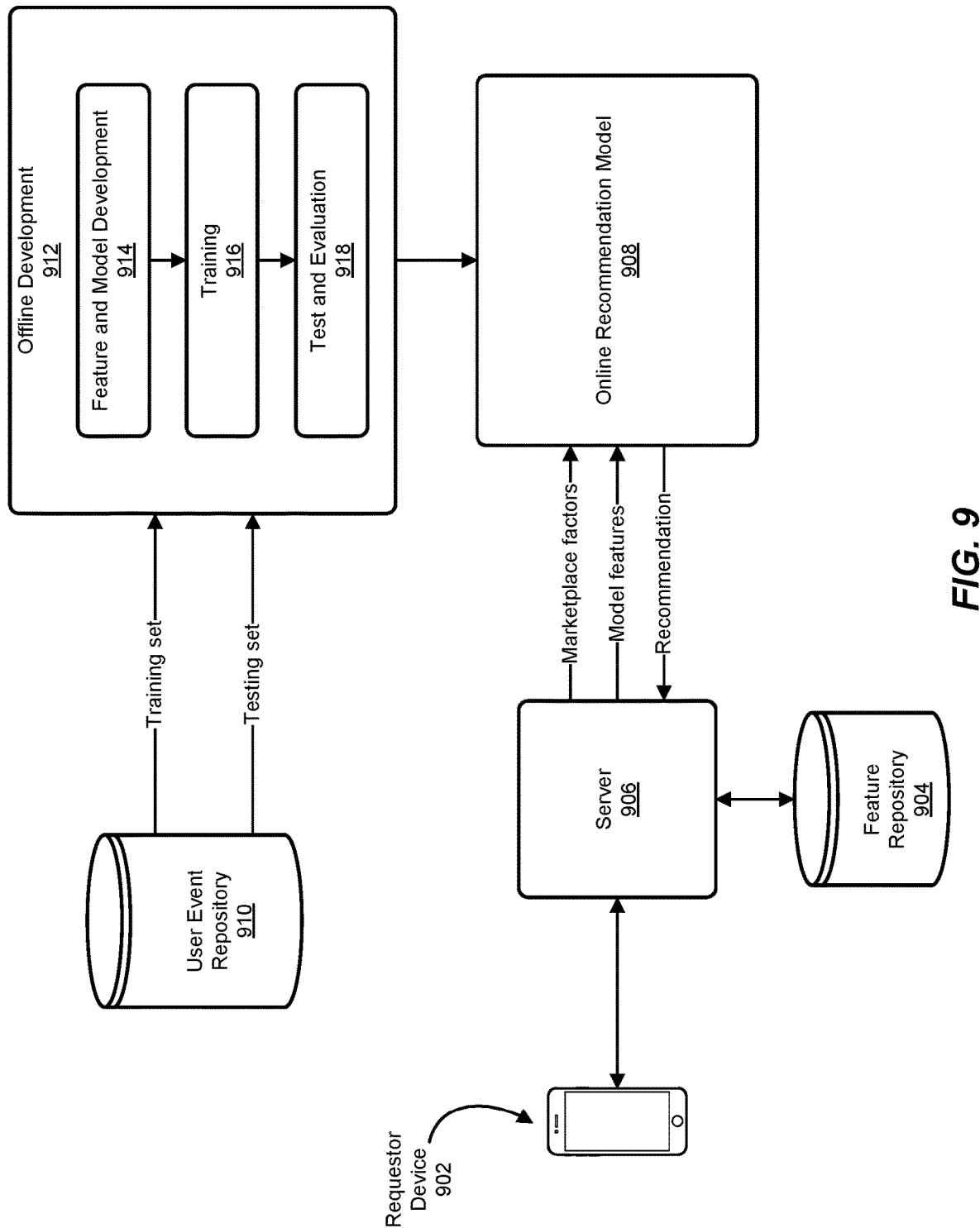
FIG. 9 is an illustration of an example architecture for training a neural network to dynamically select transportation options.

FIG. 9 illustrates an example architecture for training a neural network to dynamically select transportation options. In some embodiments, the systems described herein may include a neural network that is trained to predict which transportation options a transportation requestor device is likely to select based on the previous history of selections made by the requestor device and/or devices associated with requestors who share similar characteristics with a requestor associated with the requestor device. For example, the matching system may use a feed-forward neural network. In some embodiments, some or all of the neural network training may happen offline. Additionally or alternatively, some of the training may happen online. In some examples, offline development 912 may include feature and model development 914, training 916, and/or test and evaluation 918. In one embodiment, a user event repository 910 that includes data about past requestor demographics and/or transportation option selections may supply the training and/or testing data. In one example, when a requestor device 902 sends a request to a server 906, server 906 may determine what transportation options to suggest based on data from a feature repository 904 and/or an online recommendation model 908 that is informed by the results of offline development 912. In one embodiment, the output of the machine learning model may include a collection of vectors of floats, where each vector represents a requestor and each float within the vector represents the probability that that requestor will choose a particular transportation option if that transportation option is presented. In some embodiment, the recent history of a requestor may be weighted higher than older history. For example, if a requestor had previously been in the habit of selecting luxury transportation options but has not selected a luxury transportation option in the past month and/or has just refused a luxury transportation option in the past day, the model may determine that the probability of the requestor selecting a luxury transportation option is lower than if the user had recently selected a luxury transportation option.

Figure 10:
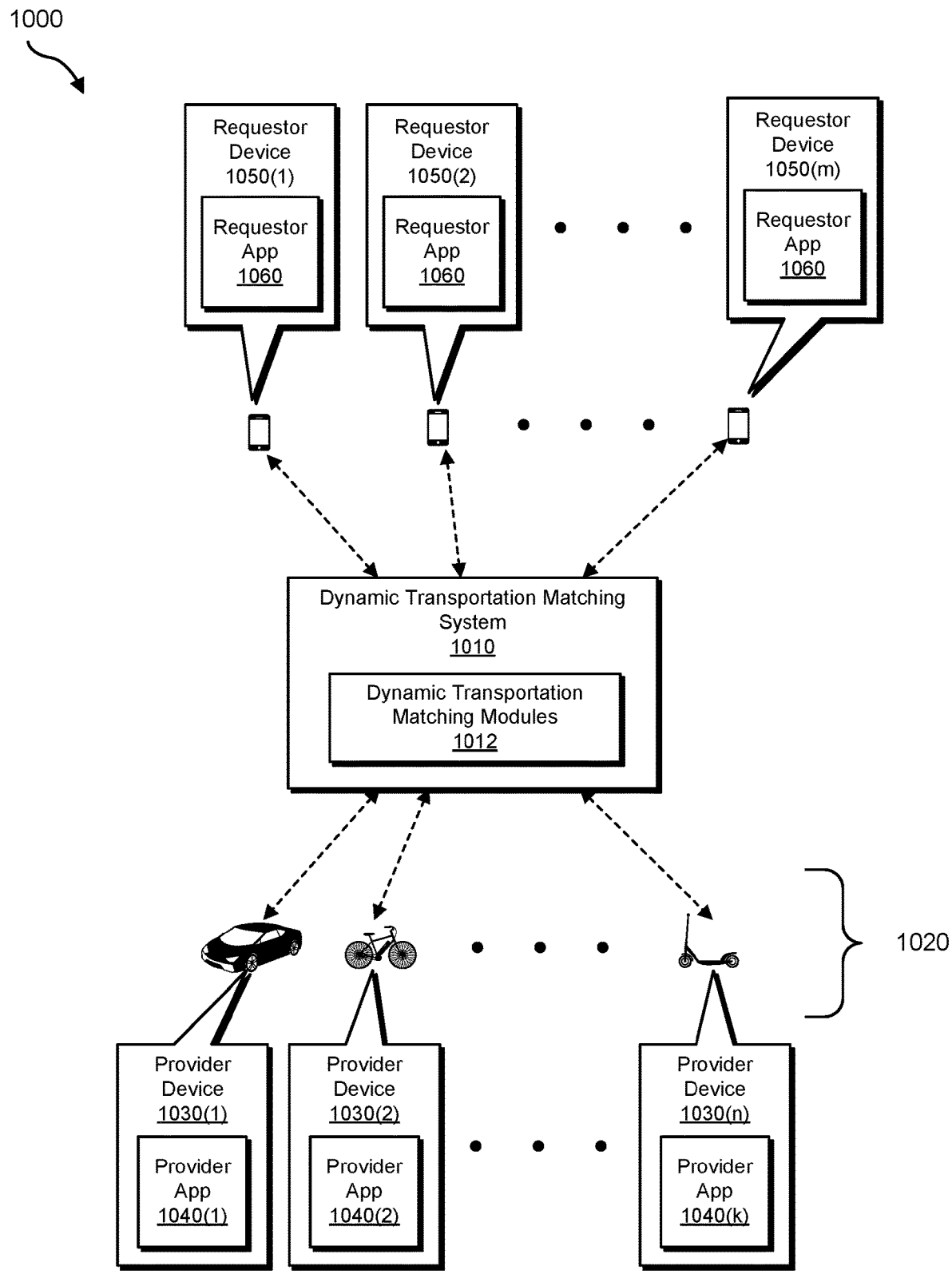
FIG. 10 is a block diagram of an example system for displaying autonomous vehicle environmental awareness.

FIG. 10 illustrates an example system 1000 for matching transportation requests with a dynamic transportation network that includes personal mobility vehicles. As shown in FIG. 10, a dynamic transportation matching system 1010 may be configured with one or more dynamic transportation matching modules 1012 that may perform one or more of the steps described herein. Dynamic transportation matching system 1010 may represent any computing system and/or set of computing systems capable of matching transportation requests. Dynamic transportation matching system 1010 may be in communication with computing devices in each of a group of vehicles 1020. Vehicles 1020 may represent any vehicles that may fulfill transportation requests. In some examples, vehicles 1020 may include disparate vehicle types and/or models. For example, vehicles 1020 may include road-going vehicles and personal mobility vehicles. In some examples, some of vehicles 1020 may be standard commercially available vehicles. According to some examples, some of vehicles 1020 may be owned by separate individuals (e.g., transportation providers). Furthermore, while, in some examples, many or all of vehicles 1020 may be human-operated, in some examples many of vehicles 1020 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 10 does not specify the number of vehicles 1020, it may be readily appreciated that the systems described herein are applicable to hundreds of vehicles, thousands of vehicles, or more. In one example, dynamic transportation matching system 1010 may coordinate transportation matchings within a single region for 50,000 vehicles or more on a given day. In some examples, vehicles 1020 may collectively form a dynamic transportation network that may provide transportation supply on an on-demand basis to transportation requestors.

As mentioned above, dynamic transportation matching system 1010 may communicate with computing devices in each of vehicles 1020. The computing devices may be any suitable type of computing device. In some examples, one or more of the computing devices may be integrated into the respective vehicles 1020. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1010.

As shown in FIG. 10, vehicles 1020 may include provider devices 1030(1)-(n) (e.g., whether integrated into the vehicle, permanently affixed to the vehicle, temporarily affixed to the vehicle, worn by a driver of the vehicle, etc.). In some examples, provider devices 1030 may include a provider apps 1040(1)-(k). Provider apps 1040(1)-(k) may represent any application, program, and/or module that may provide one or more services related to operating a vehicle and/or providing transportation matching services. For example, provider apps 1040(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1040(1)-(k) may match the user of provider apps 1040(1)-(k) (e.g., a transportation provider) with transportation requestors through communication with dynamic transportation matching system 1010. In addition, and as is described in greater detail below, provider apps 1040(1)-(k) may provide dynamic transportation management system 1010 with information about a provider (including, e.g., the current location of the provider and/or vehicle) to enable dynamic transportation management system 1010 to provide dynamic transportation matching and/or management services for the provider and one or more requestors. In some examples, provider apps 1040(1)-(k) may coordinate communications and/or a payment between a requestor and a provider. According to some embodiments, provider apps 1040(1)-(k) may provide a map service, a navigation service, a traffic notification service, and/or a geolocation service.

Additionally, as shown in FIG. 10, dynamic transportation matching system 1010 may communicate with requestor devices 1050(1)-(m). In some examples, requestor devices 1050 may include a requestor app 1060. Requestor app 1060 may represent any application, program, and/or module that may provide one or more services related to requesting transportation matching services. For example, requestor app 1060 may include a transportation matching application for requestors. In some examples, requestor app 1060 may match the user of requestor app 1060 (e.g., a transportation requestor) with transportation providers through communication with dynamic transportation matching system 1010. In addition, and as is described in greater detail below, requestor app 1060 may provide dynamic transportation management system 1010 with information about a requestor (including, e.g., the current location of the requestor) to enable dynamic transportation management system 1010 to provide dynamic transportation matching services for the requestor and one or more providers. In some examples, requestor app 1060 may coordinate communications and/or a payment between a requestor and a provider. According to some embodiments, requestor app 1060 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 11:
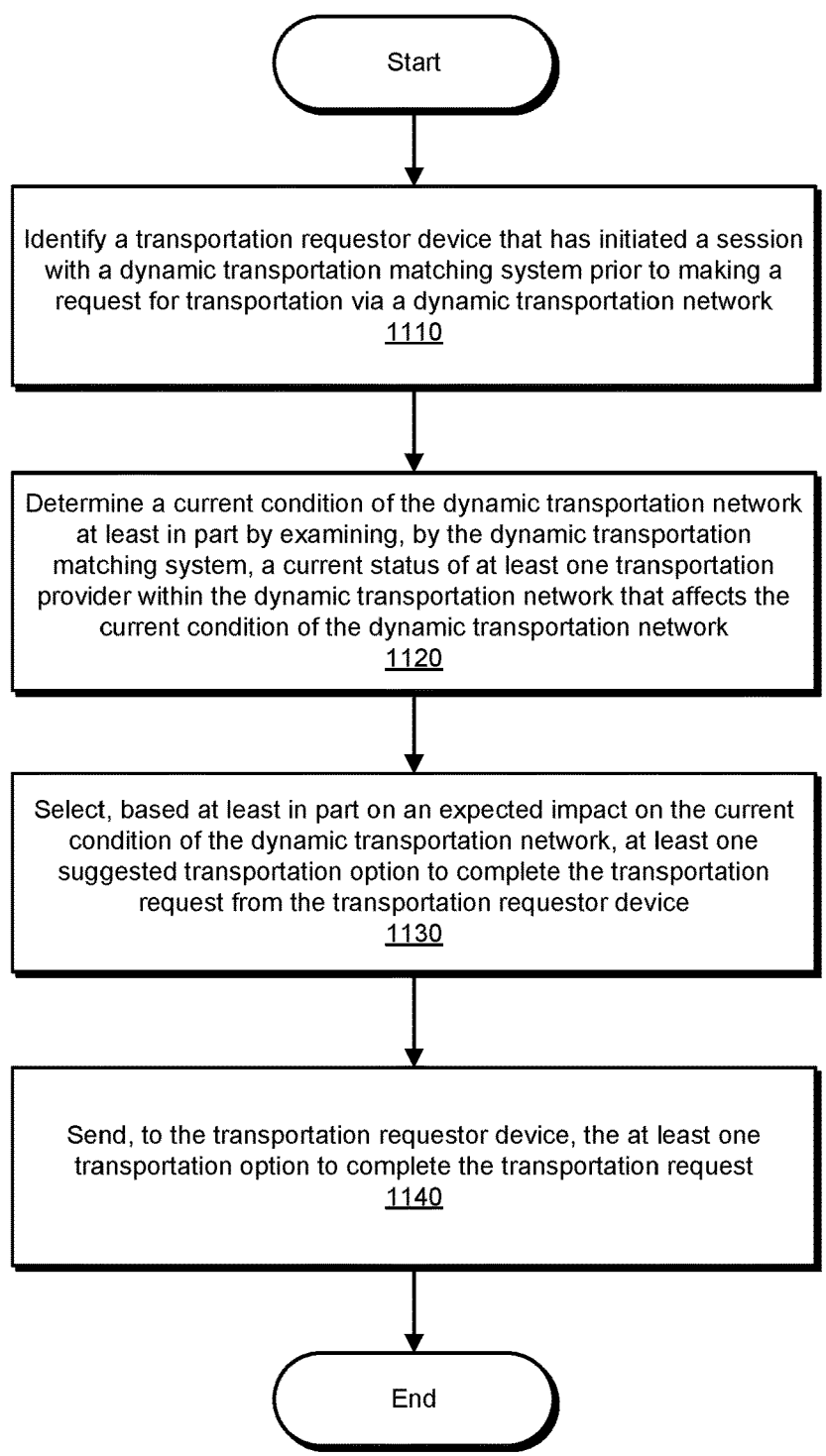
FIG. 11 is a flow diagram of an example method for displaying autonomous vehicle environmental awareness.

FIG. 11 illustrates an example method 1100 for determining allocation of personal mobility vehicles. As illustrated in FIG. 11, at step 1110, one or more of the systems described herein may identify that a transportation requestor device has initiated a session with to a dynamic transportation matching system prior to making a request for transportation via a dynamic transportation network that is managed by the dynamic transportation matching system.

At step 1120, one or more of the systems described herein may determine a current condition of the dynamic transportation network at least in part by examining, by the dynamic transportation matching system, a current status of at least one transportation provider within the dynamic transportation network that affects the current condition of the dynamic transportation network.

In one embodiment, the dynamic transportation matching system may determine the current condition of the dynamic transportation network at least in part by examining the current status of the at least one transportation provider within the dynamic transportation network by examining a provider utilization rate of the dynamic transportation network.

At step 1130, one or more of the systems described herein may select, based at least in part on an expected impact on the current condition of the dynamic transportation network, at least one transportation option to complete the transportation request from the transportation requestor device.

In one embodiment the dynamic transportation matching system may examine the current status of the at least one transportation provider within the dynamic transportation network by determining that an availability of transportation providers is below a predetermined threshold for network transportation provider availability. In this embodiment, selecting the transportation option may include selecting, in response to determining that the availability of transportation providers is below the predetermined threshold for network transportation provider availability, a transportation option that enables a transportation provider to complete at least one additional transportation request at least in part during a trip that completes the transportation request.

In one embodiment, the systems described herein may select the transportation option by identifying a set of transportation options and rank the set of transportation options based on an impact on the transportation network and/or a probability of being selected by the transportation requestor device.

In some examples, the systems described herein may select the transportation option to complete the transportation request from the transportation requestor device by selecting the transportation option based at least in part on a history of previously selected transportation options associated with the transportation requestor device. In some embodiments, the systems described herein may select the transportation option to complete the transportation request based at least in part on the history of previously selected transportation options by (i) identifying a time context and/or a location context of the transportation request, (ii) identifying a relevant portion of the history of previously selected transportation options, where each previously selected transportation option within the relevant portion of the history of previously selected transportation options shares the time context and/or the location context of the transportation request, and, (iii) selecting the transportation option to complete the transportation request based at least in part on the relevant portion of the history of previously selected transportation options.

Additionally or alternatively, the systems described herein may select the transportation option to complete the transportation request based at least in part on the history of previously selected transportation options by determining that the probability that the transportation requestor device will select the transportation option is above a predetermined probability and selecting the transportation option in response to determining that the probability that the transportation requestor device will select the transportation option is above the predetermined probability. In some examples, the systems described herein may select the transportation option to complete the transportation request from the transportation requestor device by selecting the transportation option based at least in part a destination of the transportation request and/or the current location of the transportation requestor device.

In one embodiment, the dynamic transportation matching system may examine the current status of the at least one transportation provider within the dynamic transportation network by determining that a an expected arrival time of transportation providers is above a predetermined threshold for expected arrival time and may select the suggested transportation option by selecting, in response to determining that the expected arrival time of transportation providers is above the predetermined threshold for expected arrival time, a transportation option that involves a delay in matching the transportation requestor device with a transportation provider.

In some examples, the systems described herein may select the transportation option to complete the transportation request from the transportation requestor device by selecting the transportation option based at least in part an expected impact of selecting the transportation option on a provider availability rate of the dynamic transportation network.

At step 1140, one or more of the systems described herein may send, to the transportation requestor device, the at least one transportation option to complete the transportation request.

In one embodiment, the systems described herein send the at least one transportation option to the transportation requestor device while a transportation requestor associated with the transportation requestor device is being transported by the dynamic transportation network. In one example, the option may include an option for the transportation requestor device to switch from a current transportation option to the transportation option.

In one embodiment, the systems described herein receive an instruction from the transportation requestor device selecting the transportation option and may complete the transportation request via the transportation option by sending an instruction to a transportation provider device that directs a transportation provider associated with the transportation provider device to perform the transportation option.

In one embodiment, the systems described herein may select the transportation option by selecting, based on a current status of the dynamic transportation network, a transportation provider option for completing the transportation request to present to the transportation provider and may facilitate transportation availability within the dynamic transportation network by sending an additional instruction to the transportation provider device that includes an option to complete the transportation request via the transportation provider option. In some examples, the systems described herein may select the transportation provider option by selecting a transportation provider option that is contrary to at least one stored preference of the transportation provider.

In one embodiment, the systems described herein may receive a response to the instruction from the transportation requestor device, select, based at least in part on the response to the instruction, at least one additional transportation option, and send an additional instruction to the transportation requestor device that includes an option to complete the transportation request via the at least one additional transportation option.

In one embodiment, the systems described herein may enable improved prediction of future overall transportation network status by receiving an instruction from the transportation requestor device selecting the transportation option, recording that the transportation requestor device selected the transportation option, and selecting a future transportation option to present to the transportation requestor device at a specified time based at least in part on determining that the transportation requestor device selected the transportation option.

In one example, the systems described herein may enable improved prediction of future overall transportation network status sending, to the transportation requestor device, an additional option to pre-request transportation from a destination of the transportation request to an additional destination at a specified future time.

Figure 12:
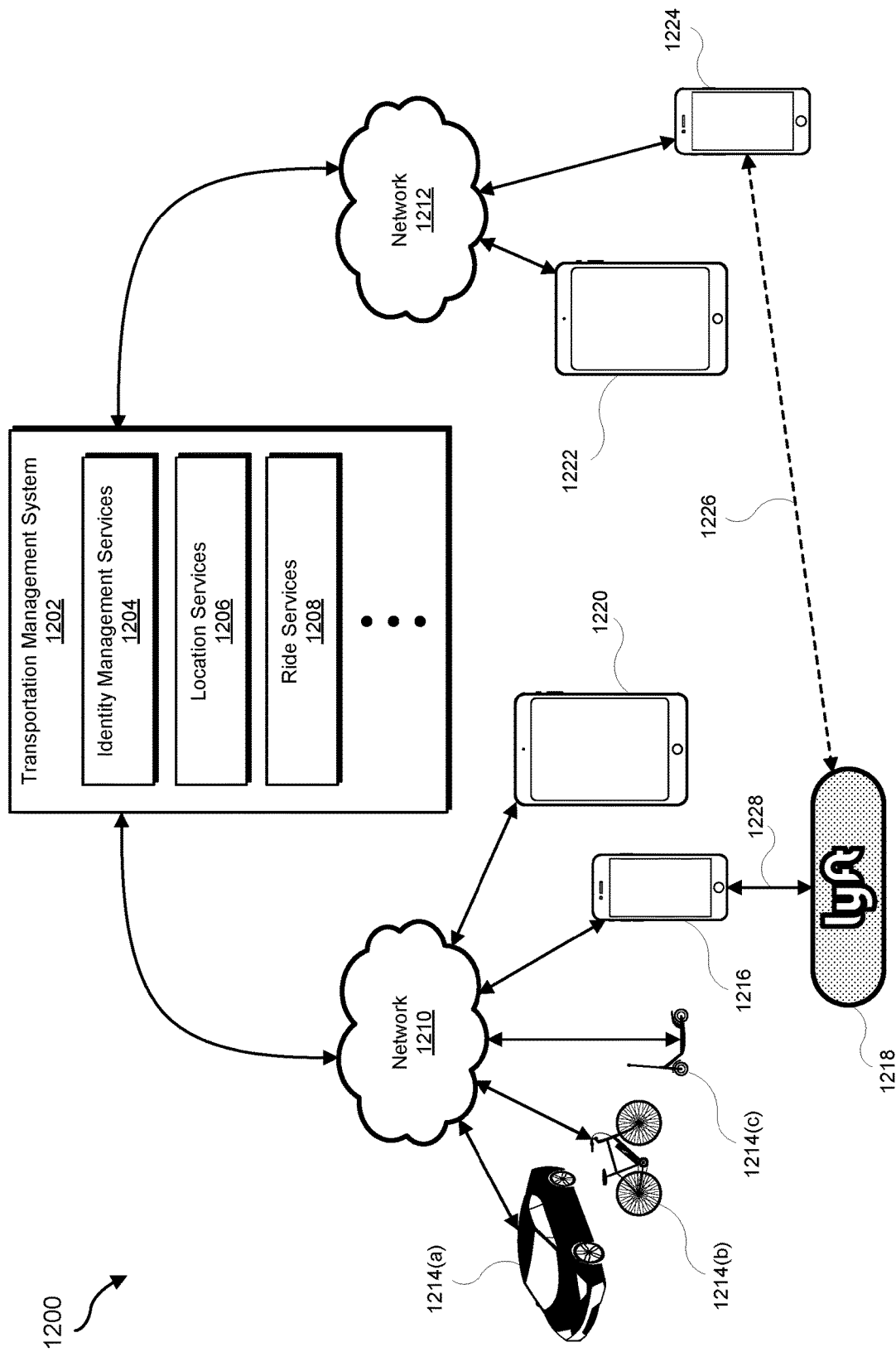
FIG. 12 is an illustration of an example requestor/provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214(*a*), 1214(*b*), and/or 1214(*c*); provider computing devices 1216 and tablets 1220; and transportation management vehicle devices 1218), and/or more or more devices associated with a ride requestor (e.g., the requestor's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for requestors and providers and/or manage their interactions and/or data with transportation management system 1202. This may include, e.g., authenticating the identity of providers and determining that they are authorized to provide services through transportation management system 1202. Similarly, requestors' identities may be authenticated to determine whether they are authorized to receive the requested services through transportation management system 1202. Identity management services 1204 may also manage and/or control access to provider and/or requestor data maintained by transportation management system 1202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1202 may also manage and/or control access to provider and/or requestor data stored with and/or obtained from third-party systems. For example, a requester or provider may grant transportation management system 1202 access to a third-party email, calendar, or task management system (e.g., via the user's credentials). As another example, a requestor or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a requestor to a provider. For example, after identity management services module 1204 has authenticated the identity a ride requestor, ride services module 1208 may attempt to match the requestor with one or more ride providers. In some embodiments, ride services module 1208 may identify an appropriate provider using location data obtained from location services module 1206. Ride services module 1208 may use the location data to identify providers who are geographically close to the requestor (e.g., within a certain threshold distance or travel time) and/or who are otherwise a good match with the requestor. Ride services module 1208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1208 may use rule-based algorithms and/or machine-learning models for matching requestors and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a requestor computing device (e.g., device 1224) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, requestor computing device 1224, requestor tablet 1222, and any other device (e.g., smart watch, smart tags, etc.). For example, transportation management vehicle device 1218 may be communicatively connected to provider computing device 1216 and/or requestor computing device 1224. Transportation management vehicle device 1218 may establish communicative connections, such as connections 1226 and 1228, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
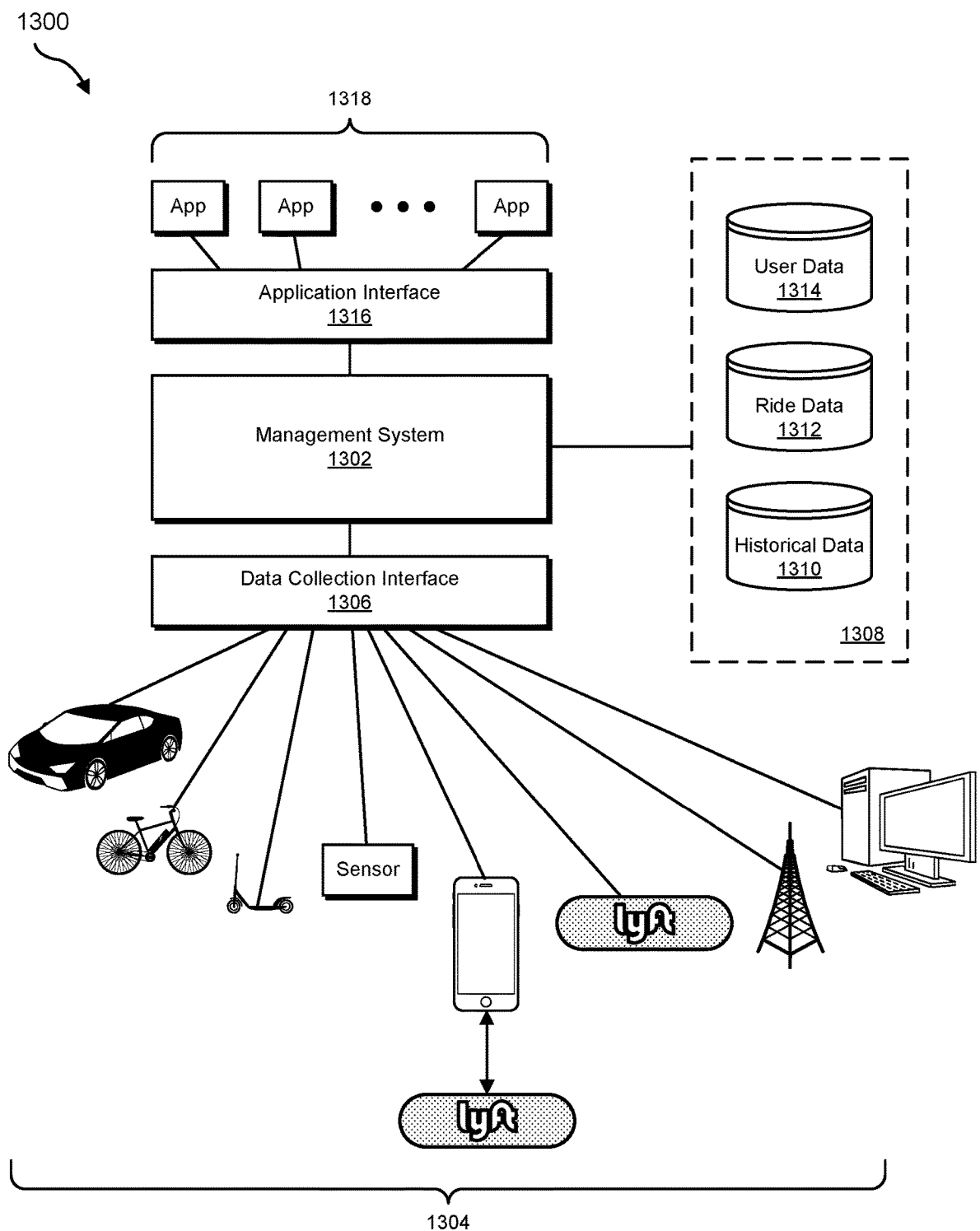
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 may include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-area network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method comprising:
   determining that a transportation requester device has initiated a session with a dynamic transportation network;
   prior to receiving a request for transportation via the dynamic transportation network, determining a current state of a plurality of different transportation provider options within a specific distance of the transportation requester device;

identifying, based at least in part on the determined current state of the different transportation provider options, which transportation provider options are available for the transportation requester device;

training a neural network in a first stage using a first set of training data representing different types of transportation provider options that are available through the dynamic transportation network;

training the neural network in a second stage using a second set of training data representing the ranking factors for the different transportation provider options, such that the neural network is trained to dynamically rank the available transportation provider options according to the ranking factors;

ranking, by the trained neural network, the available transportation provider options according to one or more ranking factors, wherein the ranking factors are specific to each type of transportation provider option; and sending, to the transportation requester device for display on the transportation requester device, the ranked list of available transportation provider options.

2. The computer-implemented method of claim 1, wherein the ranked list of available transportation provider options is presented on the transportation requestor device.

3. The computer-implemented method of claim 1, wherein ranking the available transportation provider options according to the one or more ranking factors is based at least in part on a probability of the transportation provider options being selected.

4. The computer-implemented method of claim 1, wherein the ranked list of available transportation provider options increases a relative prominence of at least one available transportation provider option.

5. The computer-implemented method of claim 4, wherein increasing the relative prominence of the at least one available transportation provider option comprises highlighting that transportation provider option in a user interface.

6. The computer-implemented method of claim 5, wherein the highlighted transportation provider option is different than the highest-ranked transportation provider option.

7. The computer-implemented method of claim 1, further comprising:
regenerating the ranked list of available transportation options at a specified interval; and
re-ranking the list of available transportation options in real time based on one or more changes in at least one of the ranking factors.

8. The computer-implemented method of claim 1, further comprising generating a new ranked list of available transportation provider options in response to receiving, from the transportation requester device, a selection or rejection of a specific transportation provider option.

9. The computer-implemented method of claim 1, wherein the ranked list of available transportation provider options ranks at least one personal mobility vehicle option higher than at least one passenger vehicle option.

10. The computer-implemented method of claim 1, wherein the displayed ranked list of available transportation provider options allows selection of one or more of the available transportation provider options.

11. The computer-implemented method of claim 1, wherein the one or more ranking factors includes a history of previously selected transportation provider options associated with the transportation requester device.

12. The computer-implemented method of claim 11, wherein the ranking factor that includes the history of previously selected transportation provider options is generated by:
determining that a probability that the transportation requester device will select a specified transportation provider option is above a predetermined probability; and
selecting the transportation provider option in response to determining that the probability that the transportation requester device will select the specified transportation provider option is above the predetermined probability.

13. A system comprising:
a non-transitory memory; and
one or more hardware processors configured to execute instructions from the non-transitory memory to perform operations comprising:
determining that a transportation requester device has initiated a session with a dynamic transportation network;
prior to receiving a request for transportation via the dynamic transportation network, determining a current state of a plurality of different transportation provider options within a specific distance of the transportation requester device;
identifying, based at least in part on the determined current state of the different transportation provider options, which transportation provider options are available for the transportation requester device;
training a neural network in a first stage using a first set of training data representing different types of transportation provider options that are available through the dynamic transportation network;
training the neural network in a second stage using a second set of training data representing the ranking factors for the different transportation provider options, such that the neural network is trained to dynamically rank the available transportation provider options according to the ranking factors;
ranking, by the trained neural network, the available transportation provider options according to one or more ranking factors, wherein the ranking factors are specific to each type of transportation provider option; and
sending, to the transportation requester device for display on the transportation requester device, the ranked list of available transportation provider options.

14. The system of claim 13,
the ranked list of available transportation provider options is presented on the transportation requestor device.

15. The system of claim 13, wherein ranking the available transportation provider options according to the one or more ranking factors is based at least in part on a probability of the transportation provider options being selected.

16. The system of claim 13, wherein the ranked list of available transportation provider options increases a relative prominence of at least one available transportation provider option.

17. The system of claim 16, wherein increasing the relative prominence of the at least one available transportation provider option comprises highlighting that transportation provider option in a user interface.

18. The system of claim 13, further comprising:
regenerating the ranked list of available transportation options at a specified interval; and
re-ranking the list of available transportation options in real time based on one or more changes in at least one of the ranking factors.

19. A computer-readable medium comprising:
computer-readable instructions that, when executed by at least one processor of a computing device, cause the computing device to:
- determine that a transportation requester device has initiated a session with a dynamic transportation network;
- prior to receiving a request for transportation via the dynamic transportation network, determining a current state of a plurality of different transportation provider options within a specific distance of the transportation requester device;
- identify, based at least in part on the determined current state of the different transportation provider options, which transportation provider options are available for the transportation requester device;
- train a neural network in a first stage using a first set of training data representing different types of transportation provider options that are available through the dynamic transportation network;
- train the neural network in a second stage using a second set of training data representing the ranking factors for the different transportation provider options, such that the neural network is trained to dynamically rank the available transportation provider options according to the ranking factors;
- rank, by the trained neural network, the available transportation provider options according to one or more ranking factors, wherein the ranking factors are specific to each type of transportation provider option; and
- send, to the transportation requester device for display on the transportation requester device, the ranked list of available transportation provider options.

20. The computer-readable medium of claim 19, wherein the computing device further generates a new ranked list of available transportation provider options in response to receiving, from the transportation requester device, a selection or rejection of a specific transportation provider option.

* * * * *